United States Patent
Michiels et al.

(10) Patent No.: US 10,547,449 B2
(45) Date of Patent: Jan. 28, 2020

(54) PROTECTION AGAINST RELAY ATTACKS IN A WHITE-BOX IMPLEMENTATION

(71) Applicant: NXP B.V., Eindhoven (NL)

(72) Inventors: Wilhelmus Petrus Adrianus Johannus Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 15/607,730

(22) Filed: May 30, 2017

(65) Prior Publication Data
US 2018/0351743 A1    Dec. 6, 2018

(51) Int. Cl.
| | | |
|---|---|---|
| H04L 9/32 | (2006.01) | |
| H04L 9/06 | (2006.01) | |
| H04L 29/06 | (2006.01) | |
| G06Q 20/32 | (2012.01) | |
| G06Q 20/38 | (2012.01) | |

(52) U.S. Cl.
CPC .............. *H04L 9/32* (2013.01); *H04L 9/0631* (2013.01); *H04L 9/3271* (2013.01); *H04L 63/0846* (2013.01); *H04L 63/12* (2013.01); *G06F 2207/7219* (2013.01); *G06Q 20/3278* (2013.01); *G06Q 20/382* (2013.01); *H04L 63/0428* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 8,306,216 B2 | 11/2012 | Michiels et al. | |
| 8,966,642 B2 * | 2/2015 | Quinn | G06F 21/57 |
| | | | 713/2 |
| 9,455,833 B2 | 9/2016 | Michiels et al. | |
| 9,825,991 B2 * | 11/2017 | Ivanchykhin | H04L 63/08 |

(Continued)

FOREIGN PATENT DOCUMENTS

EP    3099002 A1    11/2016

OTHER PUBLICATIONS

Chothia et al.; Relay Cost Bounding for Contactless EMV Payments; 2015; Retrieved from the Internet <URL: https://link.springer.com/chapter/10.1007/978-3-662-47854-7_11>; pp. 1-22, as printed. (Year: 2015).*

(Continued)

*Primary Examiner* — Saleh Najjar
*Assistant Examiner* — Michael W Chao
(74) *Attorney, Agent, or Firm* — Daniel D. Hill

(57) ABSTRACT

A method is provided for performing a cryptographic operation in a white-box implementation on a mobile device. The cryptographic operation is performed in the mobile device for a response to a challenge from a mobile device reader. The mobile device reader includes a time-out period within which the cryptographic operation must be completed by the mobile device. In accordance with an embodiment, a first time period to complete the cryptographic operation on the mobile device is determined. A predetermined number of dummy computations are added to the cryptographic operation to increase the first time period to a second time period. The second time period is only slightly less than the time-out period by a predetermined safety value to make it less likely a relay attack with be successful.

20 Claims, 10 Drawing Sheets

(56) References Cited

U.S. PATENT DOCUMENTS

| | | | |
|---|---|---|---|
| 2006/0041642 A1* | 2/2006 | Rosner | H04L 43/50 709/220 |
| 2007/0136211 A1* | 6/2007 | Brown | G07F 7/1083 705/75 |
| 2008/0232405 A1* | 9/2008 | Gallo | H04L 47/10 370/498 |
| 2009/0168997 A1* | 7/2009 | Blythe | H04L 63/1466 380/34 |
| 2009/0251289 A1* | 10/2009 | Amtmann | G06F 21/445 340/10.1 |
| 2010/0224682 A1* | 9/2010 | Busch-Sorensen | H04L 9/3278 235/380 |
| 2012/0002807 A1* | 1/2012 | Michiels | H04L 9/002 380/28 |
| 2012/0093313 A1* | 4/2012 | Michiels | H04L 9/002 380/255 |
| 2012/0170739 A1* | 7/2012 | Karroumi | H04L 9/0631 380/28 |
| 2012/0249296 A1* | 10/2012 | Savry | G06K 7/0008 340/5.65 |
| 2012/0324557 A1* | 12/2012 | Rubin | G06F 21/50 726/7 |
| 2014/0082696 A1 | 3/2014 | Danev et al. | |
| 2014/0365776 A1* | 12/2014 | Smets | H04L 9/0841 713/171 |
| 2015/0227922 A1* | 8/2015 | Filler | G06Q 20/367 705/41 |
| 2016/0140539 A1* | 5/2016 | Ma | G06Q 20/3278 705/73 |
| 2016/0214391 A1 | 7/2016 | Ward et al. | |
| 2016/0323312 A1* | 11/2016 | Voelker | H04L 63/08 |
| 2016/0352509 A1* | 12/2016 | Wu | G09C 1/00 |
| 2017/0034138 A1* | 2/2017 | Vaudenay, Jr. | H04L 63/0435 |
| 2017/0127225 A1 | 5/2017 | Hillan | |
| 2017/0295026 A1* | 10/2017 | Guilley | G09C 1/00 |
| 2017/0352298 A1* | 12/2017 | Drexler | G09C 1/00 |

OTHER PUBLICATIONS

Hancke, G.P., "Confidence in Smart Token Proximity: Relay Attacks Revisited", Royal Holloway, University of London, Computer & Security, Aug. 19, 2008.

Mangard, S., "Power Analysis Attacks: Revealing the Secrets of Smart Cards", ISBN 978-0-387-38162-6; Springer, 2007.

Silberschneider, R., "Access Without Permission: A Practical RFID Relay Attack", Institute for Applied Information Processing and Communications (IAIK), Oct. 2013.

Tillich, S., "Security Analysis of an Open Car Immobilizer Protocol Stack", University of Bristol, Computer Science Department, ACNS 2012.

* cited by examiner

PROTECTION AGAINST RELAY ATTACKS IN A WHITE-BOX IMPLEMENTATION

BACKGROUND

Field

This disclosure relates generally to electronic device security and more specifically to protecting against a relay attack in a white-box implementation.

Related Art

White-box implementations are software implementations of cryptographic algorithms in which the key is hidden from an attacker. Unlike a black-box implementation where the attacker only has access to the inputs and outputs, in a white-box implementation the attacker is assumed to have full access to and full control over the implementation. White-box cryptography is the discipline of deriving secure white-box implementations and its goal is sometimes referred to as "hiding keys in full sight".

Even if a white-box implementation achieves its goal of hiding the key perfectly, this still leaves an attacker the option to misuse the functionality of the key. This means that an attacker who wants to illegitimately decrypt a message, does not do this by first extracting the key, but by using the cryptographic implementation. To illustrate this, consider the following relay attack on a mobile payment application. The victim has a mobile device, such as a smart phone, on which a payment application is installed together with its credentials. It is now profitable for the attacker to perform a payment using his own smart phone with the credentials that are stored on the victim's phone. The attacker may be able to extract the credentials from the victim's phone for use on the attacker's phone. Another way to use the victim's credentials is to relay the communication between the attacker's phone and the reader via the victim's phone. This is called a relay attack. For the relay attack to work, the attacker must be able to hide the relay attack from the reader and the victim's phone. The victim's payment application unwittingly uses its secret credentials to compute the output that the reader requires in order for the attacker to complete the transaction through the victim's phone.

One way to make the relay attack more difficult is to carefully limit the range of the wireless connection so that the attacker's phone has to be located very close the victim's phone. What is needed is a way to make a relay attack more difficult for an attacker in a white box implementation.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
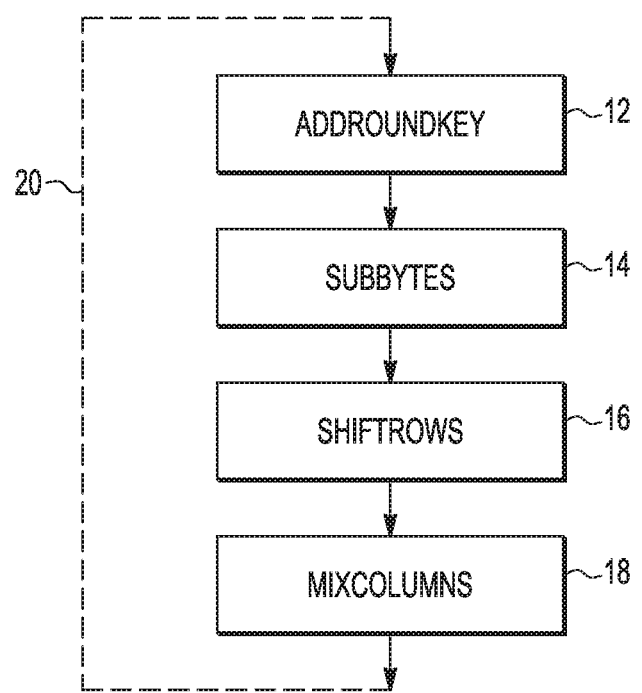
FIG. 1 illustrates the main steps in a round of AES.

Generally, there is provided, a method for performing a cryptographic operation in a white-box implementation on a mobile device that makes a relay attack more difficult. The cryptographic operation may be in response to a security challenge from a mobile device reader. The communication between the mobile device and the mobile device reader is wireless and maybe by NFC, RFID, Bluetooth, or the like. The reader includes a time-out feature in accordance with a challenge-response protocol. The method includes adding dummy, or no-op, computations to the cryptographic operation so that the execution time of the cryptographic operation requires almost all of the time available for a response before the reader times out. The no-op computations are added to the cryptographic operation so that they are difficult for an attacker to remove. By causing the cryptographic operation to be completed just in time before the end of the time-out period allows less time for a relay attack to be successful.

In one embodiment, there is provided, a method for performing a cryptographic operation in a white-box implementation, the method comprising: setting a first time period to complete the cryptographic operation on a mobile device, wherein the first time period is less than a time-out period in a mobile device reader; and performing a predetermined number of dummy computations in the cryptographic operation, the predetermined number of dummy computations for increasing the first time period to a second time period, wherein the second time period is less than the time-out period by a predetermined safety value. Performing the predetermined number of dummy computations may comprise: performing a linear encoding; performing an inverse of the linear encoding; and repeating the steps of applying a linear encoding and applying an inverse of the linear encoding a number of times. The method may further comprise performing the cryptographic operation in the mobile device as a response to a challenge from the mobile device reader. The time-out period in the mobile device reader may be a time-out period for receiving a response to a challenge from the mobile device. The cryptographic operation may be one of an advanced encryption standard (AES) operation, a data encryption standard (DES) operation or a triple DES operation. Adding the predetermined number of dummy computations to the cryptographic operation may further comprise: merging a contribution of an input byte of an output column of an advanced encryption standard (AES) round into a single table; adding a randomly chosen linear encoding on an output of the single table; removing the linear encoding from the output of the single table; and repeating the steps of adding and removing a predetermined number of times. Adding a predetermined number of dummy computations to the cryptographic operation may further comprise adding computations to the cryptographic operation of each of a plurality of mobile devices so that the cryptographic operation is completed within substantially the second time period in all of the plurality of mobile devices. The mobile device may be characterized as being a smart phone. Adding a predetermined number of dummy computations may further comprise computing a function composition for a predetermined number of functions. The mobile device may communicate wirelessly with the mobile device reader. The wireless communication between the mobile device and the mobile device reader may be characterized as being near field communication (NFC).

In another embodiment, there is provided, a method for performing a cryptographic operation in a white-box implementation on a mobile device, the method comprising: establishing a wireless communication between the mobile device and a mobile device reader, the mobile device reader having a time-out period within which the cryptographic operation is to be completed; performing the cryptographic operation on the mobile device in a response to a challenge from the mobile device reader; setting a first time period to complete the response on the mobile device; applying an encoding to the cryptographic operation; applying an inverse of the encoding to the cryptographic operation; and repeating the encoding and the inverse of the encoding a number of times to increase the first time period to a second time period, wherein the second time period is less than the time-out period by a predetermined safety value. The cryptographic operation may be part of a payment application on the mobile device. Establishing a wireless communication may further comprise establishing an RFID communication. The cryptographic operation may be an advanced encryption standard (AES) operation, a data encryption standard (DES) operation or a triple DES operation. Applying an encoding may further comprise applying a linear encoding, and wherein applying an inverse of the encoding further comprises applying an inverse of the linear encoding. Applying the linear encoding and applying an inverse of the linear encoding may further comprise: merging a contribution of an input byte of an output column of an advanced encryption standard (AES) round into a single table; adding a randomly chosen linear encoding on an output of the single table; and removing the linear encoding from the output of the single table. The method may further comprise applying the linear encoding and the inverse of the linear encoding to the cryptographic operation of each of a plurality of mobile devices so that the cryptographic operation is completed within substantially the second time period in all of the plurality of mobile devices. The linear encoding may further comprise applying function composition for a predetermined number of functions. Establishing wireless communication may further comprise establishing a near field communication (NFC) between the mobile device and the mobile device reader.

FIG. 1 illustrates the main steps in a round 10 of advanced encryption standard (AES) in accordance with an embodiment. AES typically operates on data blocks of 16 bytes. These are typically described as a 4×4 byte matrix, called the state, including bytes $x_{1,1}, x_{1,2}, x_{1,3}, \ldots x_{4,4}$ (see FIG. 2). The AES processing steps for round 10 include:

AddRoundKey 12—each byte of the state is XORed with a byte of the round key;

SubBytes 14—a byte-to-byte permutation using a lookup table;

ShiftRows 16—each row of the state is rotated a fixed number of bytes; and

MixColumns 18—each column is processed using a modulo multiplication in $GF(2^8)$.

The steps SubBytes 14, ShiftRows 16, and MixColumns 18 are independent of the particular key used. The key is applied in the step AddRoundKey 12. Except for the step ShiftRows 16, the processing steps can be performed on each column of a 4×4 state matrix without knowledge of the other columns. Therefore, they can be regarded as 32-bit operations as each column consists of four 8-bit values. Dashed line 20 indicates that the process is repeated until the required number of rounds has been performed.

AES may be implemented as a network of lookup tables. Each of the above steps or a combination of steps may be represented by a lookup table or by a network of lookup tables. If the AddRoundKey 12 step is implemented by exclusive ORing (XORing) with the round key, then the key is visible to the attacker in the white-box attack context. If the AddRoundKey 12 step is embedded in lookup tables, it may be made less obvious to determine the key. It is possible to replace a full round of AES by a network of lookup tables. For example, the SubBytes 14, ShiftRows 16, and MixColumns 18 steps may be implemented using table lookups.

In both a table-based white-box implementation and a finite state machine implementation of the AES round 10 of FIG. 1, all intermediate values in the implementation are encoded (as compared to a standard implementation).

The following description of the table-based white-box AES implementation is split into two steps. In the first step, a round of AES is described as a network of lookup tables. In the second step, the tables are obfuscated by encoding their inputs and outputs.

Step 1: Implementing AES as a network of lookup tables.

As stated above, the described implementation of AES operates on data blocks of 16 bytes. These are typically described as a 4×4 byte matrix, called the state and includes bytes $x_{1,1}, x_{1,2}, x_{1,3}, \ldots x_{4,4}$. Data block 22 is shown as an example in FIG. 2. The first two operations described above regarding FIG. 1, AddRoundKey 12 and SubBytes 14, can be merged into a single T-box operation. That is, a byte-to-byte function $T_{i,j}$ can be defined for input byte $x_{i,j}$ as $T_{i,j}(x_{i,j}) = S(x_{i,j} \oplus k_{i,j})$ where $k_{i,j}$ is a 16 byte round key based upon the AES key. Output bytes $y_{i,j}$ is the output of $T_{i,j}$. The ShiftRows 16 operation is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns (MC) 18 step, an output byte $z_{i,j}$ of the round is computed from the 4 output bytes $y_{1,j}, y_{2,j}, y_{3,j},$ and $y_{4,j}$ via the algebraic expression $z_{l,j} = MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in $GF(2^8)$ for some constants $MC_{l,r}$.

A lookup table is defined for each byte-to-byte function $Q_{i,j,l}(x_{i,j}) = MC_{l,i} \cdot T_{i,j}(x_{i,j})$ with $i,j,l=1,2,\ldots,16$. Then any output byte $z_{l,j}$ may be computed by XORing the results of these lookup tables, i.e., $z_{l,j} = Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of a Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 2.

Figure 2:
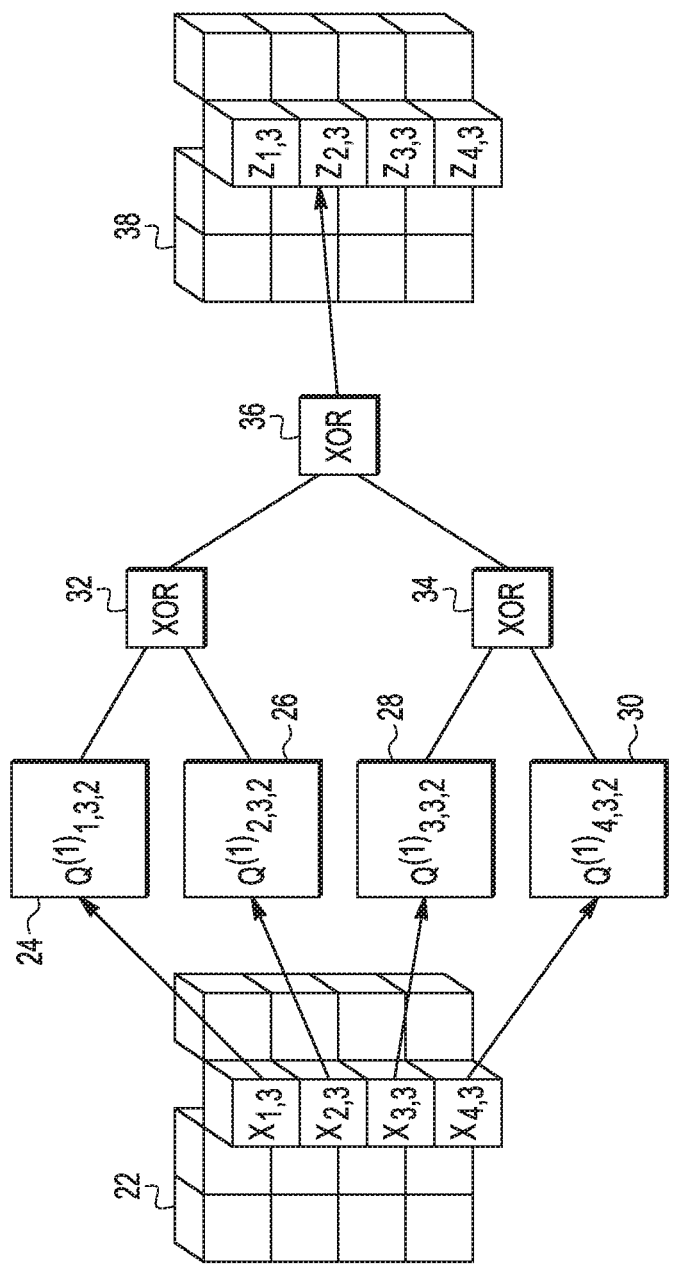
FIG. 2 illustrates the computation of one output nibble by means of a network of look-up tables.

FIG. 2 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3},$ and $x_{4,3}$ in the data block having input state 22 are input into the Q-boxes 24, 26, 28, and 30. The outputs of lookup tables 24 and 26 are fed into the XOR 32, and the outputs of lookup tables 28 and 30 are fed into the XOR 34.

The outputs of XORs 32 and 34 are fed into XOR 36. The output of XOR 36 is the first nibble of the output $z_{2,3}$ of output state 38. The second nibble of the output $z_{2,3}$ of output state 38 may be calculated in the same way using additional Q-boxes along with a similar XOR network. Further, additional sets of tables may be implemented to completely convert the input state 22 into the output state 38 by receiving a column of bytes from the input state and converting them into the output of the corresponding column of the output state.

Step 2: Obfuscating the tables and the intermediate values

A portion of the white-box implementation for a first round is illustrated in FIG. 2. In the implementation depicted in FIG. 2, the key may easily be extracted from the Q-boxes. Just applying the inverse MixColumns 18 multiplication and the inverse S-box to the output reveals the plain AddRoundKey 12 operation. To prevent this, the inputs and outputs of all lookup tables are encoded with arbitrary bijective functions.

Figure 3:
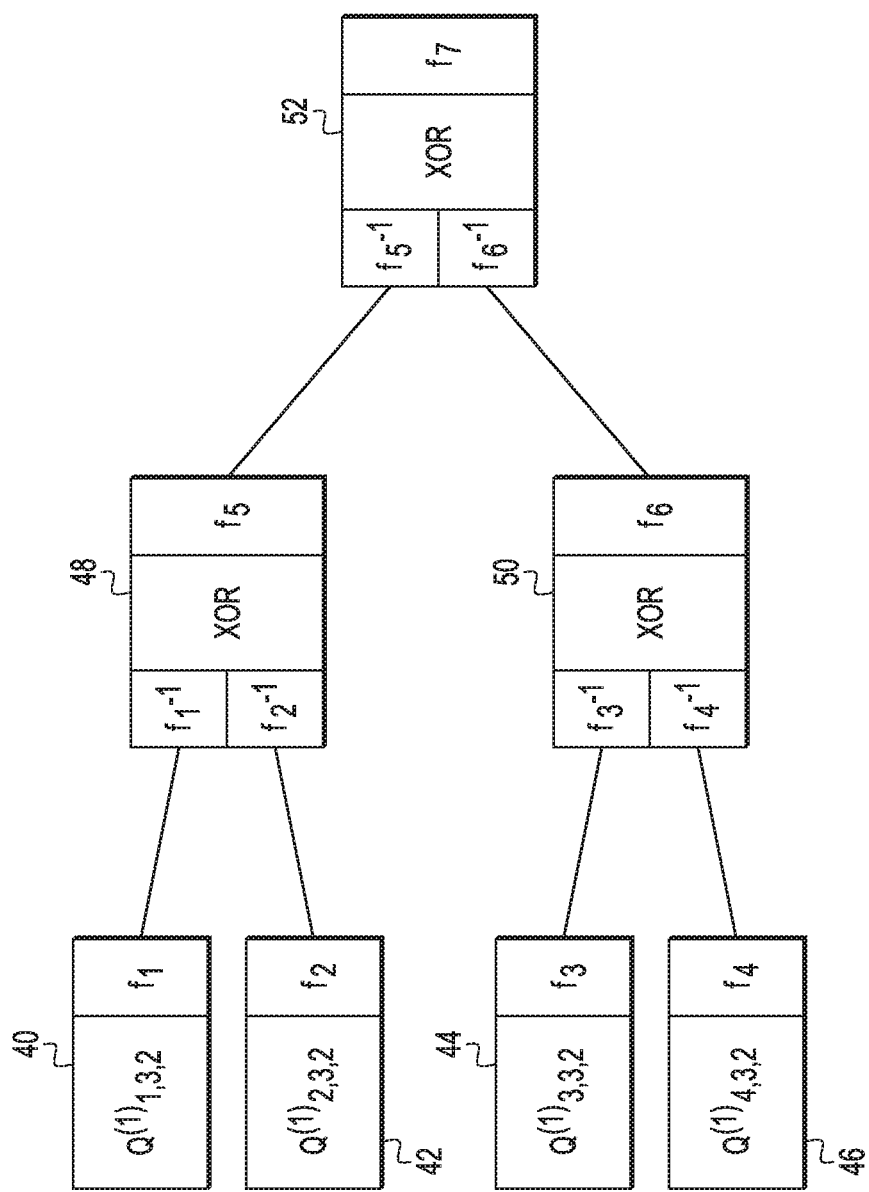
FIG. 3 illustrates a portion of the network table of FIG. 2 obfuscated by encoding the input and outputs.

FIG. 3 illustrates a portion of the network table of FIG. 2 obfuscated by encoding the inputs and outputs. Q-boxes 40, 42, 44, and 46 are merged with bijective functions $f_1$, $f_2$, $f_3$, and $f_4$, respectively. The results of merging Q-boxes 40 and 42 are fed into XOR 48 with inverse functions $f_1^{-1}$ and $f_2^{-1}$. The results of merging Q-boxes 44 and 46 are fed into XOR 50 with inverse functions $f_3^{-1}$ and $f_4^{-1}$. The results plus additional bijective functions $f_5$ and $f_6$ are merged and fed into XOR 52, where inverse bijections $f_5^{-1}$ and $f_6^{-1}$ are merged with bijective function $f_7$. Encoding with bijective functions means that a lookup table is merged with an encoding function that encodes the output with a decoding function that decodes the input. The encodings are chosen such that the output encoding of one table matches the input encoding assumed in the next tables. The input to the round is not encoded in order to be compliant with AES, but the output of the round is encoded. The output encoding is handled in the next round (see FIG. 1). That is, unlike first round 10, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation that is obtained, both the lookup tables and the intermediate values are obfuscated.

For convenience in describing the illustrated AES embodiment, it is assumed that for a selected message, the output of the S-box is 0 for all input bytes of the first round. As described later this can be changed to accommodate any randomly selected message(s). In the two XOR tables 32 and 34 that directly succeed the Q-tables 24, 26, 28, and 30 in FIG. 2, the 8-to-4 bit XOR tables 32 and 34 may be extended to 8-to-5 bit tables in another embodiment.

Figure 4:
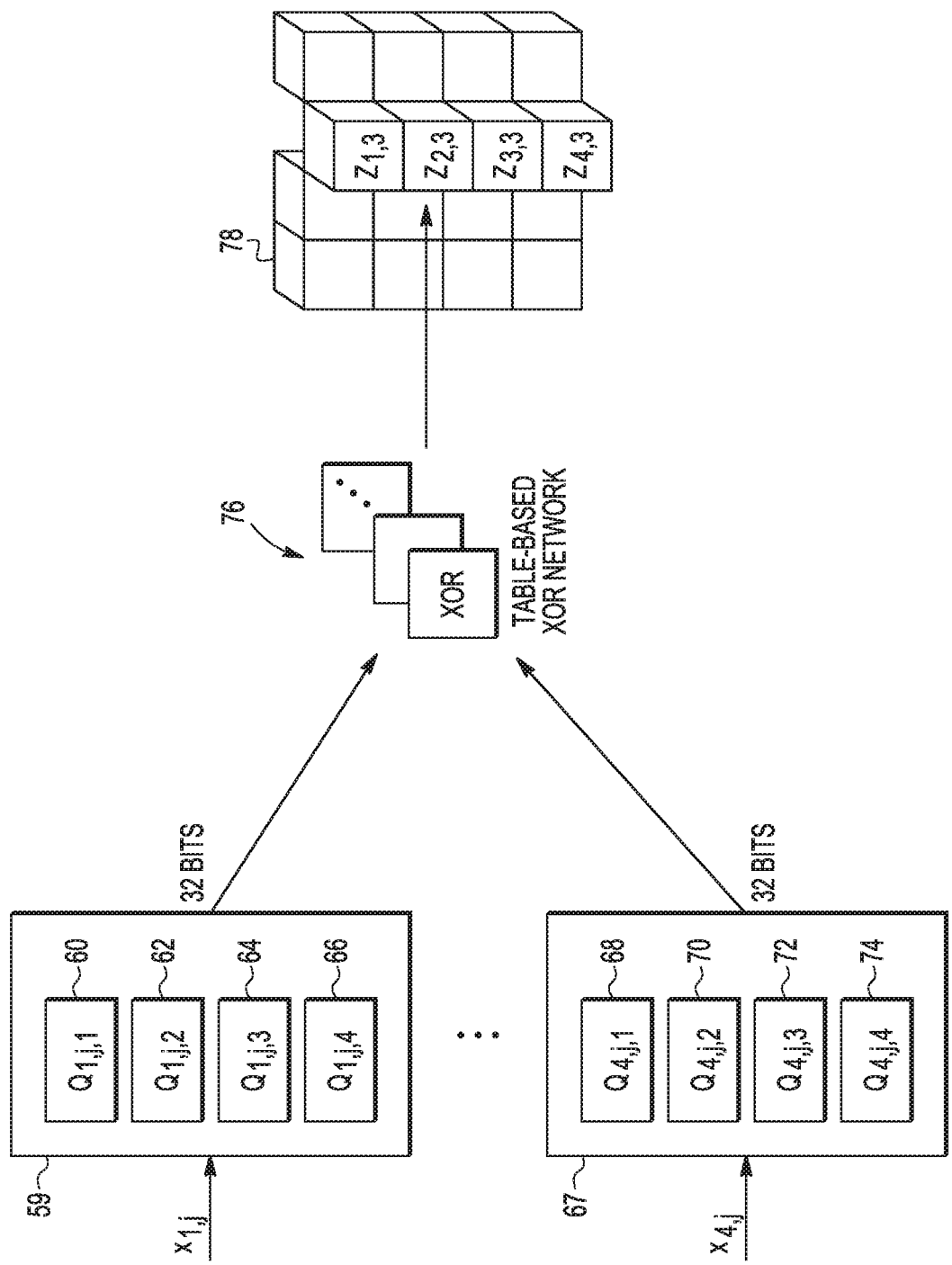
FIG. 4 illustrates the contributions of an input byte to an output column into a single table.

FIG. 4 illustrates the contributions of an input byte to an output column into a single table. Consider first round 10 of the described white-box implementation. To simplify the presentation, ShiftRows operation 16 is ignored. Two output columns 59 and 67 are illustrated. Output column 59 includes Q-boxes 60, 62, 64, and 66. Output column 67 includes Q-boxes 68, 70, 72, and 74. An input byte $x_{1,j}$ is provided to output column 59 and an input byte $x_{4,j}$ is provided to output column 67. Each input byte contributes to the value of all 4 bytes of an output column of the round. More precisely, an input byte $x_{i,j}$ contributes to byte 1 of the output column by adding value $Q_{i,j,l}(x_{i,j})$. The 4 contributions of $x_{i,j}$ are merged with the output column into a single byte-to-32-bit table. The resulting 32 byte table representing the output column is fed to XOR network 76. The output of the XOR network 76 is a data block having an output state 78.

Figure 5:
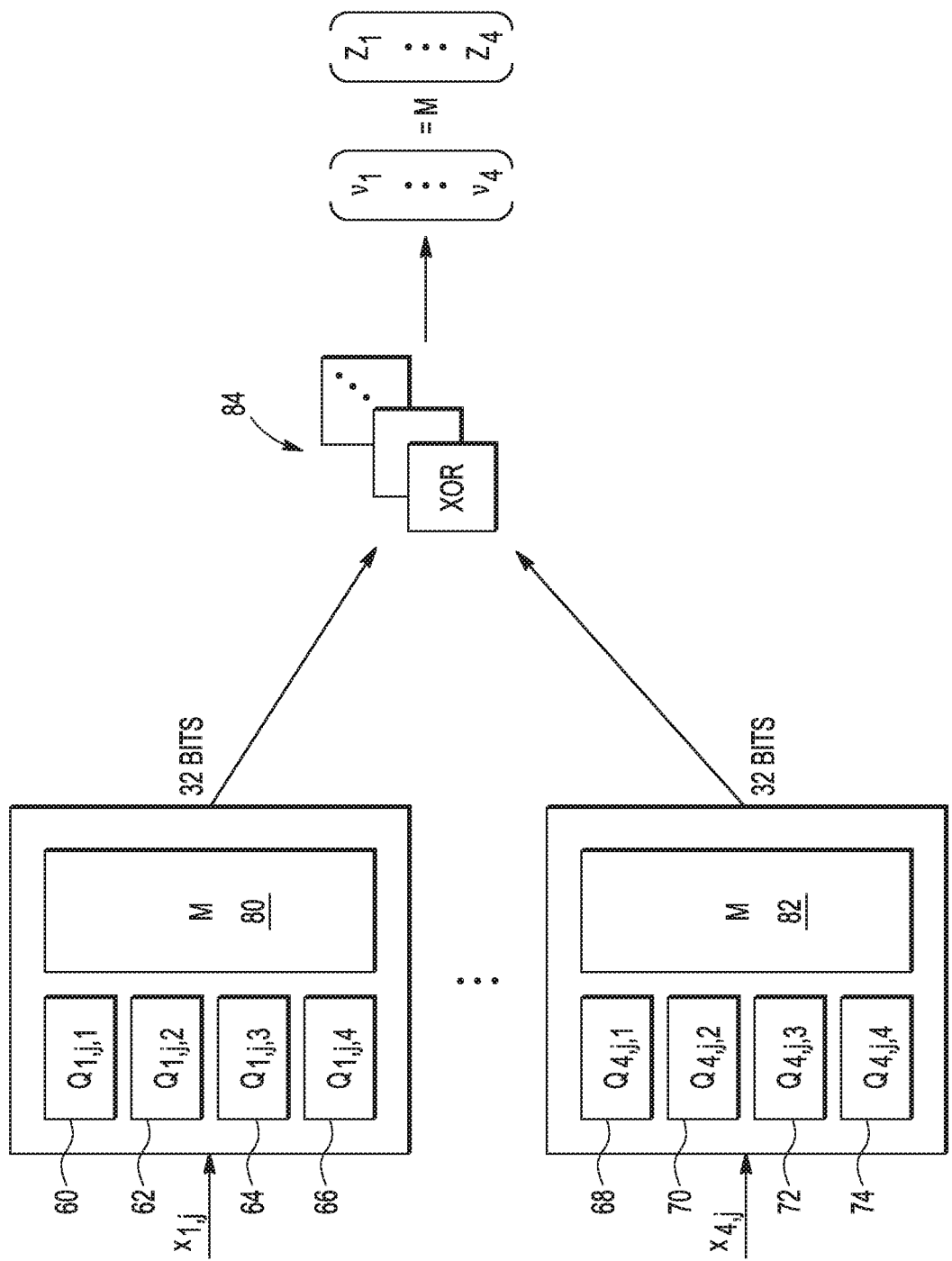
FIG. 5 illustrates the addition of linear encodings to the table of FIG. 4.

FIG. 5 illustrates the addition of linear encodings to the tables of FIG. 4 for adding delay to the white-box cryptographic operation. Note that one skilled in the art will recognize that the described techniques for adding delay can be applied to other encryption standards besides AES. As illustrated in FIG. 5, a linear encoding 80 is applied to the output of the combined Q-boxes 60, 62, 64, and 66, and a linear encoding 82 is applied to Q-boxes 68, 70, 72, and 74. In one embodiment, each of linear encodings 80 and 82 is a randomly chosen M. That is, the byte-to-32-bit tables are merged with a randomly chosen linear 32-bit bijective mapping M. The output is then fed to XOR network 84. The output of XOR network 84 provides the matrix $v_1 \ldots v_4$.

Figure 6:
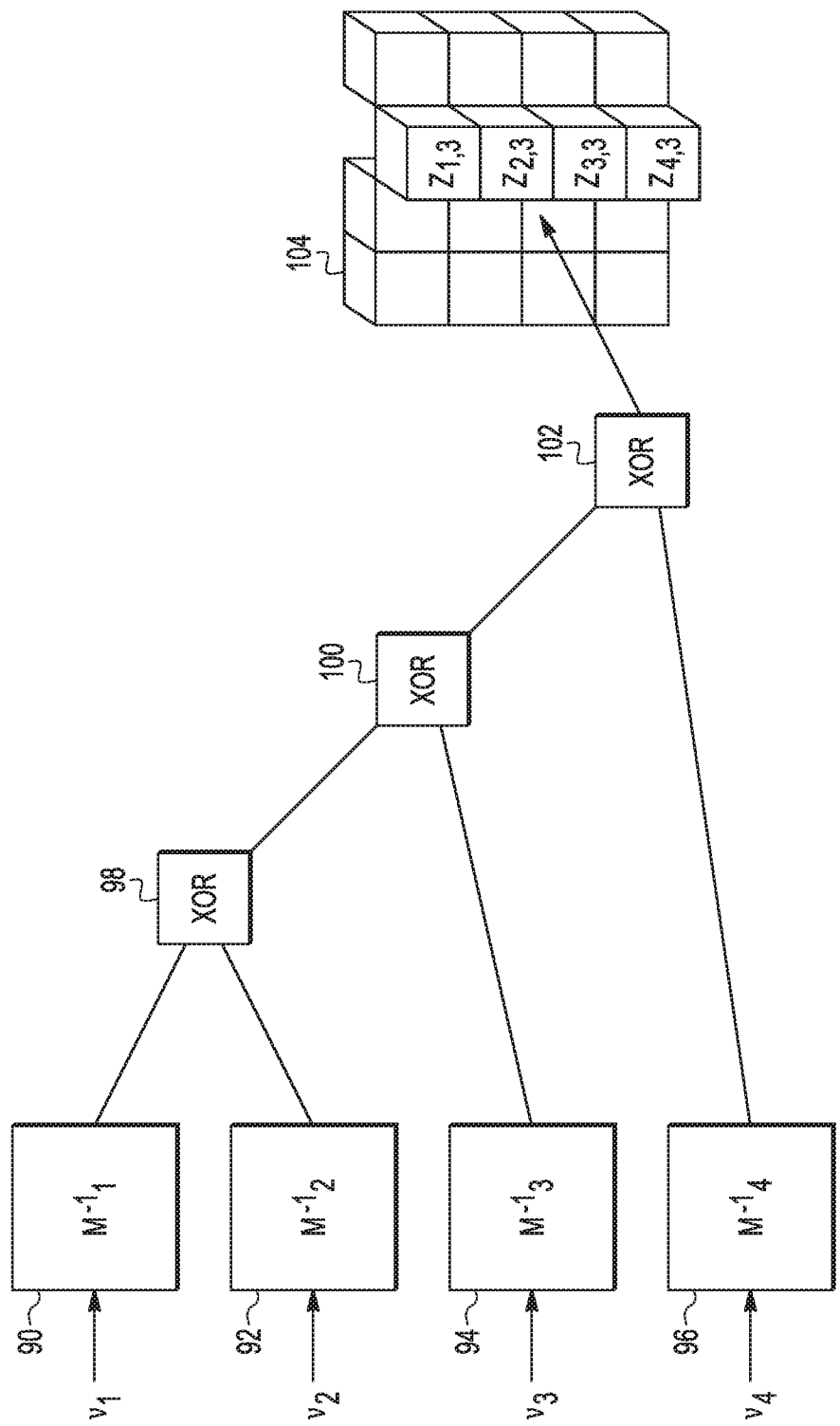
FIG. 6 illustrates a network for removing the linear encodings from the table computed in FIG. 5.

FIG. 6 illustrates a network for removing the linear encodings from the table computed in FIG. 5. Table $v_1 \ldots v_4$ is input to inverse linear encodings 90, 92, 94, and 96. The inverse linear encodings are applied to matrix $v_1 \ldots v_4$ and the results are fed into an XOR network made up of XOR operations 98, 100, and 102, and the data block 104 is recovered. More specifically, the result of the operation in FIG. 5 is that the output column $(z_1, z_2, z_3,$ and $z_4)$ is no longer computed. Instead, the value $M \cdot (z_1, z_2, z_3,$ and $z_4)^T$ is computed. Therefore, to compute the real value for the output column, the linear encoding has to be removed. That is, $M^{-1}$ is applied to the output column of FIG. 5. The linear encoding is removed by using a table network similarly to the operation of the description of FIG. 5. For this, note that $$M^{-1} \cdot \begin{pmatrix} v_1 \\ \vdots \\ v_4 \end{pmatrix} = M_1^{-1}(v_1) \oplus M_2^{-1}(v_2) \oplus M_3^{-1}(v_3) \oplus M_4^{-1}(v_4)$$

where $M_1, \ldots, M_4$ is partitioned into 4 submatrices of 8 columns, i.e., $M_i$ contains columns $8i$, $8i+1$, $\ldots$, $8i+7$. Hence, the linear encoding M can be removed by the table network depicted in FIG. 6. Adding the linear encodings and inverse linear encoding is equivalent to adding dummy, or no-op, instructions to the cryptographic operation. The no-op instructions can be added anywhere in the cryptographic operation.

Figure 7:
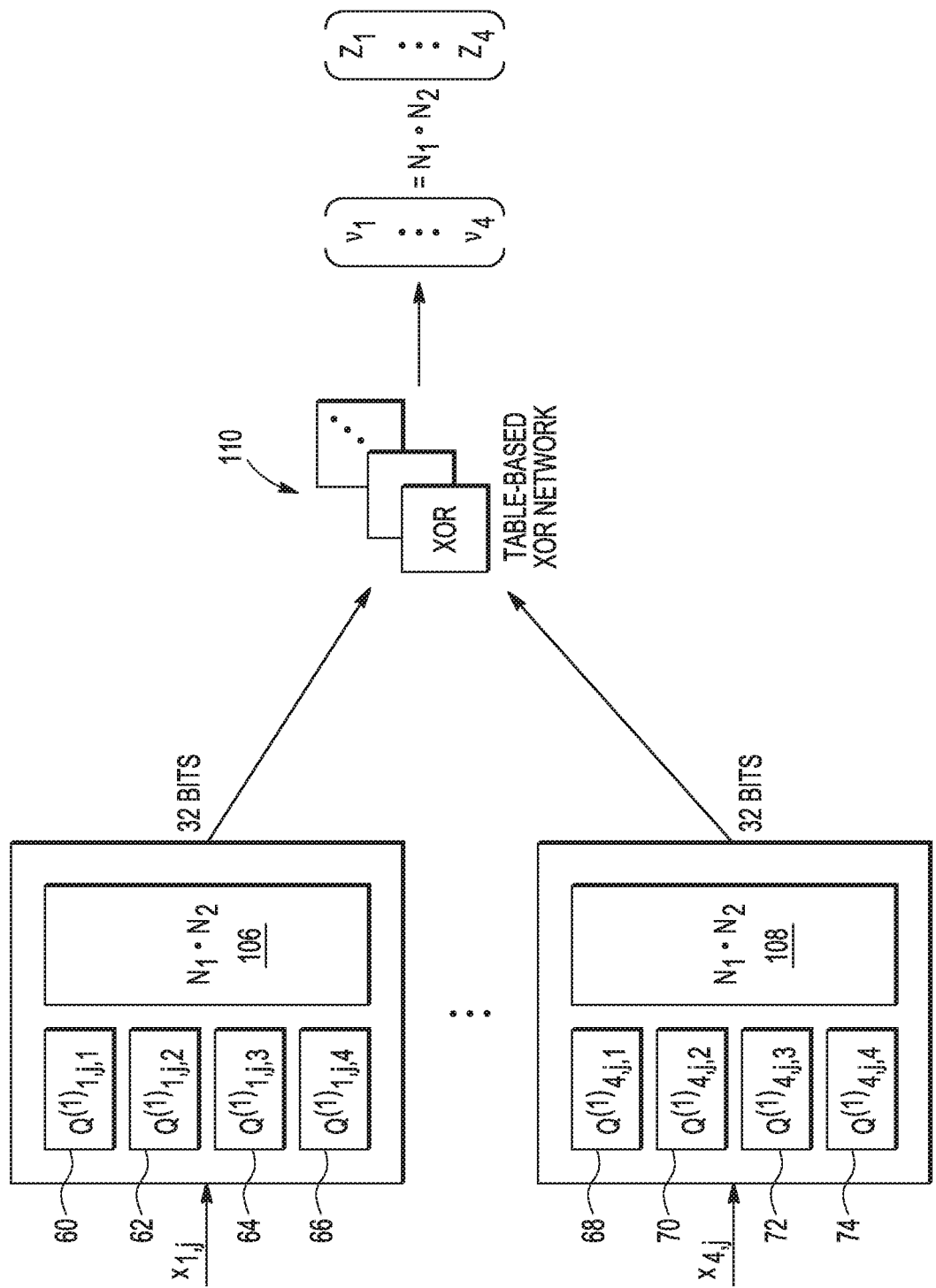
FIG. 7 illustrates the addition of linear encodings to the table of FIG. 5 in accordance with another embodiment.

FIG. 7 illustrates the addition of linear encodings to the table of FIG. 5 in accordance with another embodiment. The embodiment of FIG. 7 differs from the embodiment of FIG. 5 in that the linear bijective mappings M are replaced with function compositions 106 and 108. The function compositions $N_1 \circ N_2$ are fed into an XOR network 110 to produce table $v_1 \ldots v_4$. The function compositions are removed using inverse function compositions $N_1^{-1}$ and $N_2^{-1}$. as described above for FIG. 6.

Figure 8:
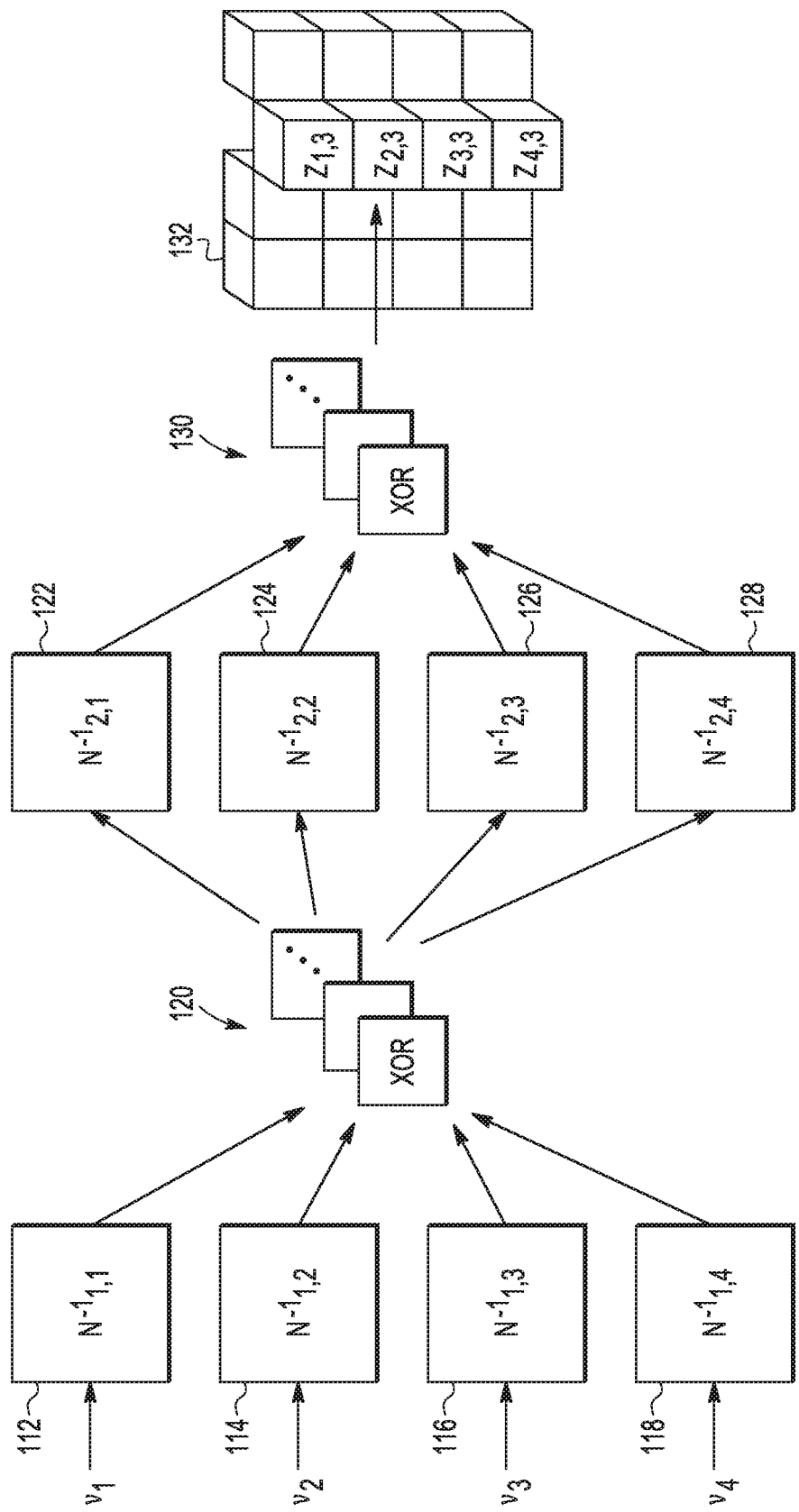
FIG. 8 illustrates the network of FIG. 7 for an additional iteration.

FIG. 8 illustrates the network of FIG. 7 for an additional iteration. The above described linear encoding step described above in FIG. 5 and in FIG. 7 can be applied an arbitrary number of times depending on how much delay needs to be added to the cryptographic operation. The number of output bytes is chosen to which the additional encoding steps are applied. In FIG. 8, as an example, the linear encoding steps are applied twice. Table $v_1 \ldots v_4$ is input to inverse encodings 112, 114, 116, and 118. The results are fed into XOR network 120. The output of XOR network 120 is input into inverse encodings 122, 124, 126, and 128. The results are fed into XOR network 130 and the output is recovered data block 132. The additional encoding steps can be stacked. The number of encodings depends on the amount of delay needed. This means that, instead of encoding the 4 tables in FIG. 5 or FIG. 7 by M, the tables can be encoded by $N_1 \circ N_2 \circ \ldots \circ N_t$, after which t networks are introduced like the one depicted in FIG. 6, where network i computes $N_i^{-1}$. FIGS. 7 and 8 show this for t=2, where $N_{i,j}$ splits $N_i$ in the same way as $M_j$ splits M.

The amount of delay added to the white-box implementation can be computed relatively precisely. The AES algorithm includes 10 rounds of which the last one does not contain a MixColumns operation. For the first 9 rounds, a byte computation is performed 16 times as shown in FIG. 2. Hence, there are 144 of such computations. Furthermore, this computation is similar to the computation that was added as shown in FIG. 6. Hence, by adding the computation of FIG. 6, an overhead of less than 1% is added to the cryptographic operation. This means the computation time of the white-box implementation can be increased to an arbitrary number with an accuracy of more than 99% (ignoring the inherent variations in computation time within a platform).

Figure 9:
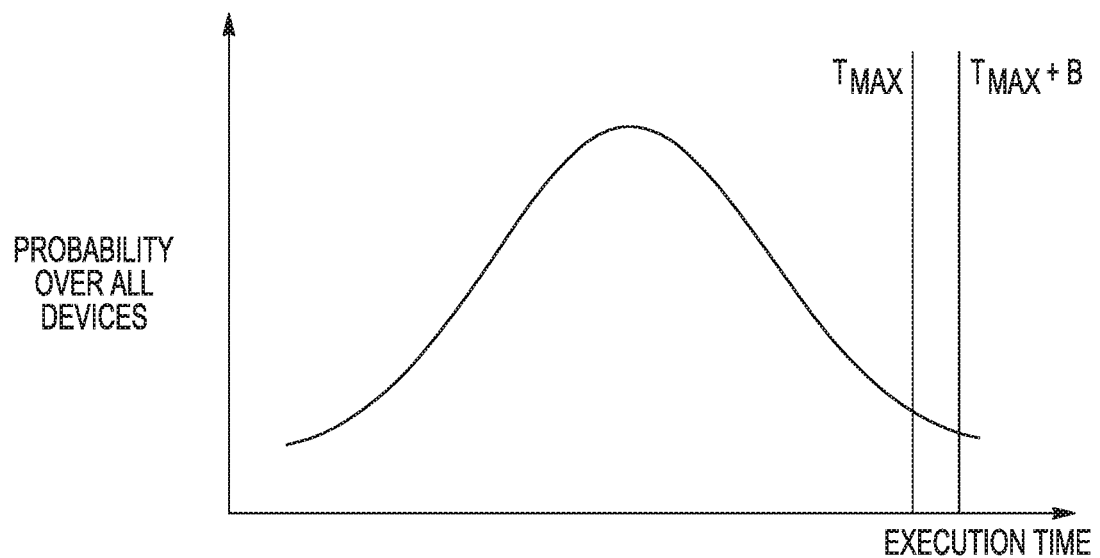
FIG. 9 and FIG. 10 illustrate a relative distribution of the response execution time before and after the addition of linear encodings.
Figure 10:
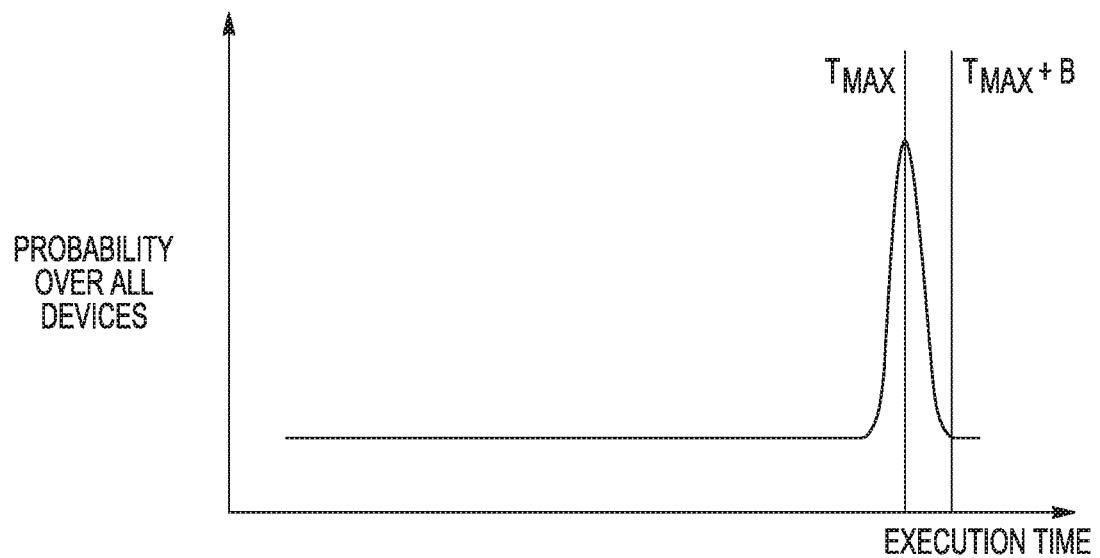

FIG. 9 and FIG. 10 illustrate a relative distribution of the response execution time before and after the addition of linear encodings to a plurality of mobile devices. FIG. 9 illustrates how the execution times of a response to a mobile device reader challenge might be relatively widely distributed for a plurality of mobile devices before adjusting the execution time. FIG. 10 illustrates how the execution times for the plurality of devices might be compressed to be close to a time $T_{MAX}$ by applying delay to each device in accordance with the described embodiment. Time $T_{MAX}$ is the desired completion execution time after delay is applied. Time $T_{MAX}+B$ is the time-out time of the reader, where time B is a slack time to allow for small variations is computation time and is considered when determining time $T_{MAX}$.

Figure 11:
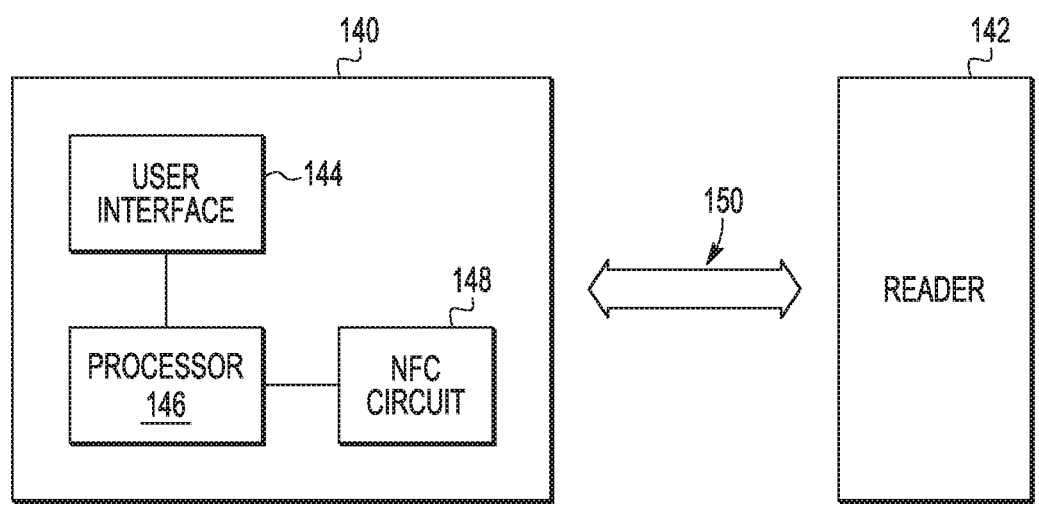
FIG. 11 illustrates a block diagram of a mobile device communicating with a mobile device reader.

FIG. 11 illustrates a simplified block diagram of a mobile device 140 communicating wirelessly 150 with a mobile device reader 142. Mobile device 140 includes user interface 144, processor 146, and RFID/NFC circuit 148. The reader 142 and mobile device 140 may communicate using one or more of various other wireless protocols in addition to or instead of NFC. When the mobile device 140 initiates wireless communication with reader 142, reader 142 attempts to authenticate mobile device 140. Reader 142 may transmit a security challenge, and mobile device 140 is required to respond correctly to the challenge. Reader 142 includes a time-out feature in accordance to the challenge-response protocol. To help defeat a relay attack, the execution time for a cryptographic operation is made to occupy most of the time allowed by reader 142 for the response before reader 142 times out. This denies the attacker enough time to complete the relay attack. Also, as described, the no-op computations are added to the cryptographic operation so that they are difficult for an attacker to remove.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for performing a cryptographic operation in a white-box implementation on a mobile device in a transaction with a mobile device reader, the method comprising:
    establishing a communication between the mobile device and the mobile device reader;
    determining a first time period required to complete the cryptographic operation on the mobile device, the first time period starting when the mobile device begins executing the cryptographic operation, wherein the first time period is less than a time-out period in the mobile device reader; and
    adding a predetermined number of dummy computations, based on the operating characteristics of the device, to the cryptographic operation the predetermined number of dummy computations for increasing the first time period to a second time period, wherein the second time period is less than the time-out period by a predetermined safety value, and wherein the predetermined safety value, and wherein the predetermined safety value is determined to allow for small variations in computation time of the cryptographic operation including the predetermined number of dummy computations.

2. The method of claim 1, wherein performing the predetermined number of dummy computations comprises:
    performing a linear encoding;
    performing an inverse of the linear encoding; and
    repeating the steps of applying a linear encoding and applying an inverse of the linear encoding a number of times.

3. The method of claim 1 further comprising performing the cryptographic operation in the mobile device as a response to a challenge from the mobile device reader.

4. The method of claim 1, wherein the time-out period in the mobile device reader is a time-out period for receiving a response to a challenge from the mobile device.

5. The method of claim 1, wherein the cryptographic operation is one of an advanced encryption standard (AES) operation, a data encryption standard (DES) operation or a triple DES operation.

6. The method of claim 1, wherein adding the predetermined number of dummy computations to the cryptographic operation further comprises:
merging a contribution of an input byte of an output column of an advanced encryption standard (AES) round into a single table;
adding a randomly chosen linear encoding on an output of the single table;
removing the linear encoding from the output of the single table; and
repeating the steps of adding and removing a predetermined number of times.

7. The method of claim 1, wherein adding a predetermined number of dummy computations to the cryptographic operation further comprises adding computations to the cryptographic operation of each of a plurality of mobile devices so that the cryptographic operation is completed within substantially the second time period in all of the plurality of mobile devices.

8. The method of claim 1, wherein the mobile device is characterized as being a smart phone.

9. The method of claim 1, wherein adding a predetermined number of dummy computations further comprises computing a function composition for a predetermined number of functions.

10. The method of claim 1, wherein the mobile device communicates wirelessly with the mobile device reader.

11. The method of claim 10, wherein the wireless communication between the mobile device and the mobile device reader is characterized as being near field communication (NFC).

12. A method for performing a cryptographic operation in a white-box implementation on a mobile device in a transaction with a mobile device reader, the method comprising:
establishing a wireless communication between the mobile device and the mobile device reader, the mobile device reader having a time-out period within which the cryptographic operation is to be completed;
initiating the cryptographic operation on the mobile device in response to a challenge from the mobile device reader:
wherein a first time period is needed to complete the response on the mobile device;
applying an encoding to the cryptographic operation;
applying an inverse of the encoding to the cryptographic operation; and
repeating the encoding and the inverse of the encoding a number of times, based on the operating characteristics of the device, to increase the first time period to a second time period, wherein the second time period is less than the time-out period by a predetermined safety value, and wherein the predetermined safety value, and wherein the predetermined safety value is determined to allow for small variations in computation time of the cryptographic operation including the predetermined number of dummy computations.

13. The method of claim 12, wherein the cryptographic operation is part of a payment application on the mobile device.

14. The method of claim 12, wherein establishing a wireless communication further comprises establishing an RFID communication.

15. The method of claim 12, wherein the cryptographic operation is an advanced encryption standard (AES) operation, a data encryption standard (DES) operation or a triple DES operation.

16. The method of claim 12, wherein applying an encoding further comprises a linear encoding, and wherein applying an inverse of the encoding further comprises applying an inverse of the linear encoding.

17. The method of claim 16, wherein applying the linear encoding and applying an inverse of the linear encoding further comprises:
merging a contribution of an input byte of an output column of an advanced encryption standard (AES) round into a single table;
adding a randomly chosen linear encoding on an output of the single table; and
removing the linear encoding from the output of the single table.

18. The method of claim 16, wherein the method further comprises applying the linear encoding and the inverse of the linear encoding to the cryptographic operation of each of a plurality of mobile devices so that the cryptographic operation is completed within substantially the second time period in all of the plurality of mobile devices.

19. The method of claim 16, wherein the linear encoding further comprises applying function composition for a predetermined number of functions.

20. The method of claim 12, wherein establishing wireless communication further comprises establishing a near field communication (NFC) between the mobile device and the mobile device reader.

* * * * *